Nov. 16, 1926.

J. L. HECHT 1,607,273

MEANS FOR THE ATTACHMENT OF PARTS OR MEMBERS TO EACH OTHER

Filed Dec. 21, 1923

INVENTOR.

BY J. L. Hecht

Rogers, Kennedy Campbell
ATTORNEYS.

Patented Nov. 16, 1926.  1,607,273

UNITED STATES PATENT OFFICE.

JOSEPH L. HECHT, OF DAVENPORT, IOWA, ASSIGNOR TO FRENCH & HECHT, OF DAVENPORT, IOWA, A FIRM COMPOSED OF G. WATSON FRENCH, JOSEPH L. HECHT, AND W. H. STACKHOUSE.

MEANS FOR THE ATTACHMENT OF PARTS OR MEMBERS TO EACH OTHER.

Application filed December 21, 1923. Serial No. 681,909.

This invention relates to means for the firm and secure attachment of parts or members to each other, and has reference more particularly to the attachment of a plate or other part or member to a stud or studs or bolt carried by a supporting member.

In the assembly of various metallic parts, a tight or drive fit is frequently required on bolts or studs of the part to be attached, and to secure such fit, very accurate workmanship is necessary in the formation of the parts; and where, as is frequently the case, the part or member to be fastened is to be fitted to a plurality of bolts or studs, not only is accurate workmanship required in connection with the individual studs and in the formation of the holes which receive the studs, but accuracy is necessary also in respect to the relative location of the holes and studs to enable the parts to be assembled with the holes in exact registration with the studs.

The aim of the present invention is to obviate the necessity for such accurate and exact workmanship in the formation of the parts under the conditions mentioned, and to enable the parts to be quickly assembled and firmly secured together, although they may not fit with extreme accuracy, or may not register exactly with each other where a plurality of bolts or studs are involved.

With these and other objects in view my invention consists in the combination with a bolt or stud adapted to extend through a hole in the part or member which is to be attached, of a contractible member adapted to surround the stud within said hole, and means carried by the stud and operable to force the contractible member into the hole and to contract the same on the stud.

In the more specific aspect of the invention, and in its preferred form, the contractible member is formed with a tapered or sloping external surface, and the hole in the part which is to be attached, is of correspondingly tapered form, the means to force the contractible member into the hole being in the form of a nut screwed on the stud and engaging the contractible member, so that by the cooperation of the tapered or sloping surfaces of the hole and the contractible member, the latter will be wedged tightly in the hole and will be contracted firmly on the stud when the nut is screwed up, and the parts will be drawn into firm engagement with each other and all looseness or play will be taken up.

Referring to the drawing:—

Figure 1:
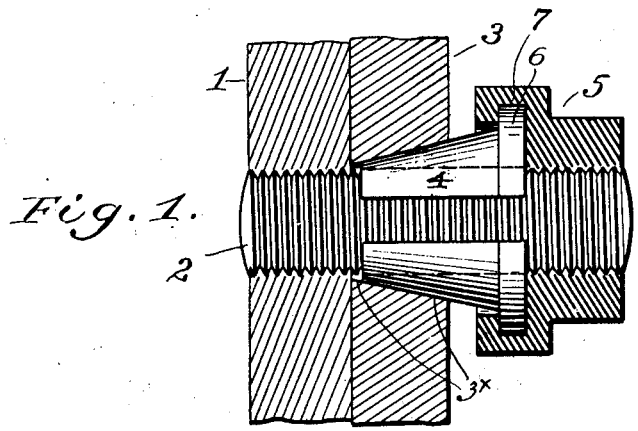
Fig. 1 is a sectional elevation of two parts or members involving a single supporting stud or bolt, connected together by means embodying my invention.
Figure 2:
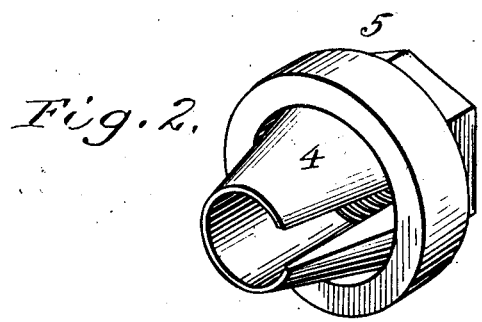
Fig. 2 is a perspective view of the contractible member and its connected operating nut.

Referring to Figs. 1 and 2, 1 designates a supporting member, in this instance in the form of a plate, and 2 designates a supporting stud fixed to and projecting from the plate, the said stud being threaded externally to enable it to be fixedly connected with the plate and for the further purpose presently to be described. 3 designates a second member, in this instance a plate which is to be secured to the supporting member and stud. The plate 3 is formed with a circular hole $3^x$ provided with sloping or tapered walls and is assembled flatwise against the supporting plate with the hole surrounding the stud, with a substantial annular space or clearance between them. 4 designates a contractible member, which in the present instance is in the form of a conical or externally tapered split sleeve which surrounds the stud and is seated in the tapered hole, and 5 designates a sleeve actuating means carried by the stud and operable on the contractible member to force the same into the hole. The sleeve actuating means in the form of the invention shown comprises a nut which is screwed on the stud and is operatively connected with the contractible member in such manner that in the rotary screwing and unscrewing motions of the nut, the contractible member will be positively moved longitudinally along the stud without rotation thereon, such connection of the nut with the contractible member being preferably formed by a peripheral shoulder 6 on the contractible member engaging loosely in an undercut groove 7 formed in the nut, and constituting in effect a swiveling connection between the nut and the contractible member.

In the use and operation of the parts described, the plate 3 is seated against the supporting plate 1, with the stud extending through the hole in plate 3, and the end of the contractible member is passed over the stud and entered in the hole, and the nut is screwed on the stud. As the nut is screwed up, the contractible member will be forced into engagement with the walls of the hole, and by the cooperation of the sloping surfaces on the parts, the contractible member will be contracted on the stud and will be wedged tightly in the hole, while at the same time the parts will be drawn together firmly, and all lost motion or play will be taken up. Due to the swiveling connection between the nut and the contractible member as shown, the rotation of the nut in screwing or unscrewing the same, will positively move the contractible member along the stud, so that the contractible member will be positively withdrawn from the hole when the nut is unscrewed in disassembling the parts.

From the foregoing description of the construction and operation of the parts, it will be understood that a fit of the plate 3 on the stud 2 may be secured answering all of the purposes and advantages of a drive fit, but without the necessity of acurately forming the parts for a drive fit, the contractible member when forced to a greater or less extent into the hole, according to the amount of clearance, acting to wedge in the hole and contract on the stud, and thereby drawing the parts into firm and tight engagement with each other. In this manner and without the necessity of employing extreme accuracy of workmanship in the formation of the hole and stud, a very firm and tight connection of the parts may be secured.

While in the case above described involving a single supporting stud, the invention possesses many valuable advantages, further advantages are obtained in cases when the part to be attached is provided with a number of holes to receive a number of studs as is frequently required.

In the use of my invention in connection with constructions of this character involving a plurality of supporting studs, it is evident that extreme accuracy in the position of the holes and studs is not required, since the contractible members will compensate for differences arising by reason of the non-registration of the parts; and the holes in the member to be secured may be fitted over the studs in the assemblage of the parts, readily and conveniently and without the necessity of bringing the parts into definite and exact relative positions, as would be the case if the member were to be fitted over the studs with a drive fit.

In the foregoing description I have set forth my invention in the particular detailed form which I prefer to adopt and which in practice has been found to answer to a satisfactory degree the objects and advantages to be secured. It is manifest however that various changes may be made in the form, construction and relation of the parts without departing from the spirit of the invention.

Having thus described my invention, what I claim is:

1. In combination with a supporting member, a stud projecting therefrom and provided with screw threads, a member adapted to be clamped to the supporting member and provided with a tapered hole receiving the stud, an externally tapered unitary contractible member surrounding the stud and seated in the hole and provided with a peripheral shoulder, and a nut screwed on the stud and provided with an internal undercut groove receiving the said peripheral shoulder.

2. In combination with a supporting member, a stud projecting therefrom and provided with screw threads, a member adapted to be clamped to the supporting member and provided with a tapered hole receiving the stud, an externally tapered unitary sleeve split longitudinally to make it contractible, said sleeve surrounding the stud and seated in said hole and provided with an external peripheral shoulder, and a nut screwed on the stud and provided with an internal undercut groove receiving the said peripheral shoulder.

In testimony whereof, I have affixed my signature hereto.

JOSEPH L. HECHT.